No. 626,279. Patented June 6, 1899.
G. R. HISLOP.
GAS PRODUCER.
(Application filed Apr. 26, 1898.)
(No Model.) 2 Sheets—Sheet 1.
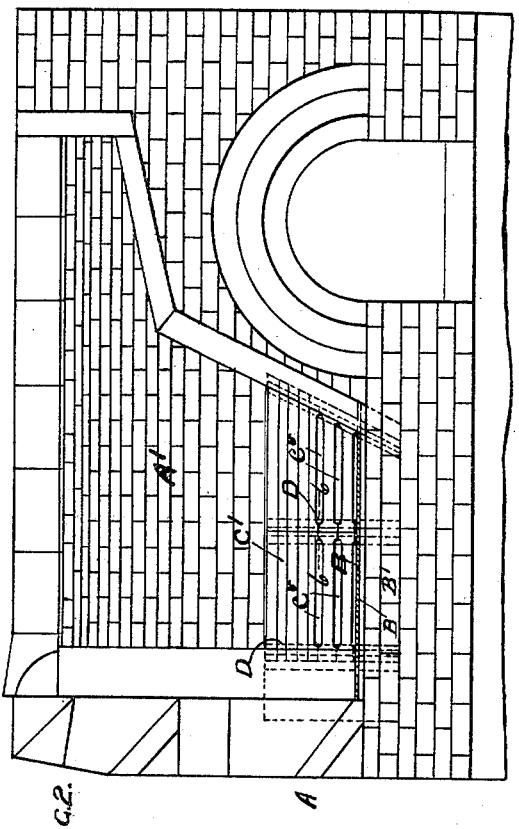
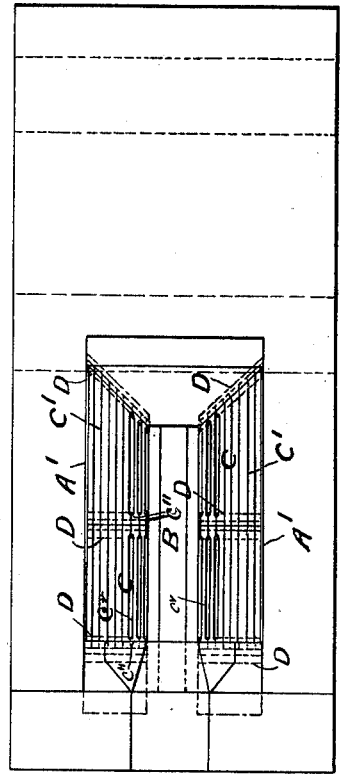
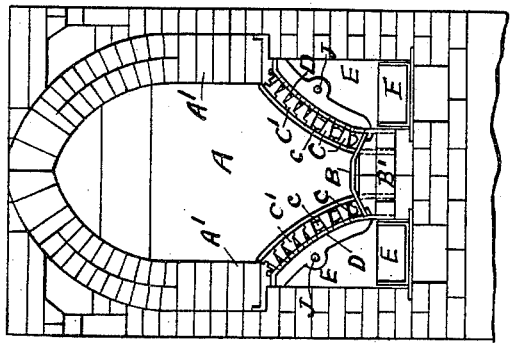
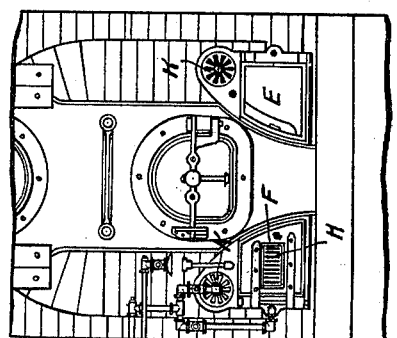
Witnesses
C. Holloway
H. C. Pinckney
Inventor:
George R. Hislop,
By J. U. Bowen
Attorney
THE NORRIS PETERS CO., PHOTO-LITHO., WASHINGTON, D. C.

No. 626,279. Patented June 6, 1899.
G. R. HISLOP.
GAS PRODUCER.
(Application filed Apr. 26, 1898.)
(No Model.) 2 Sheets—Sheet 2.
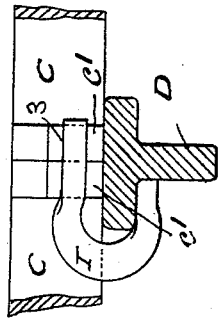
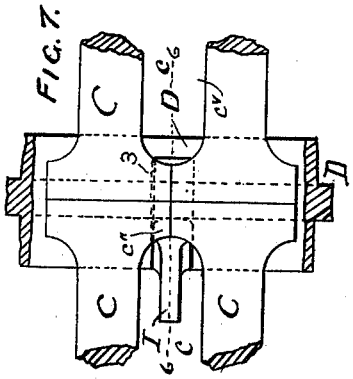
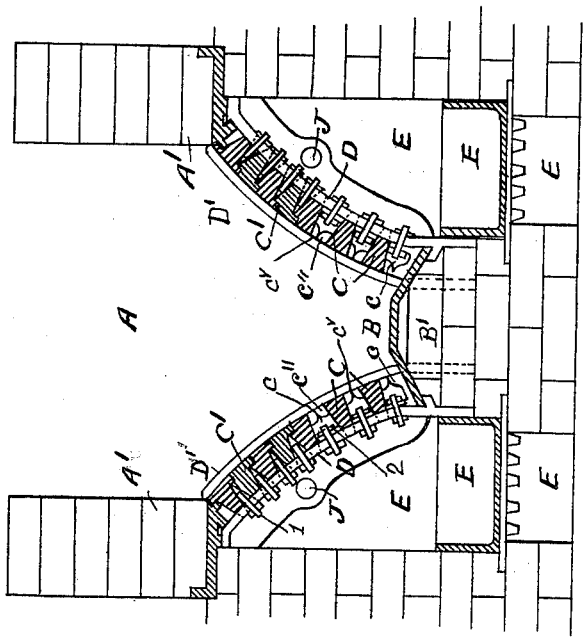
Witnesses:
C. Holloway
W. C. Pinckney
Inventor:
George R. Hislop,
By J. E. W. Bowen
Attorney

UNITED STATES PATENT OFFICE.

GEORGE ROBERTSON HISLOP, OF PAISLEY, SCOTLAND.

GAS-PRODUCER.

SPECIFICATION forming part of Letters Patent No. 626,279, dated June 6, 1899.

Application filed April 26, 1898. Serial No. 678,856. (No model.)

*To all whom it may concern:*

Be it known that I, GEORGE ROBERTSON HISLOP, engineer and gas-works manager, of the Gas Works, Paisley, in the county of Renfrew, Scotland, have invented new and useful Improvements in Gas-Producers, (for which application for patent in Great Britain, No. 22,518, dated October 1, 1897, has been made,) of which the following is a specification.

This invention has for its object to improve the construction and increase the life and efficiency of gas-producers. Hitherto such producers have been formed with a base of ordinary fire-bars placed horizontally or of a solid hearth with brickwork rising therefrom and joining the side walls of the producer.

My improvements consist in combining with a solid hearth of reduced width a series of bars or plates resting on bearing-brackets rising at a suitable angle, so as to form inclined gratings on either side of the solid hearth, extending therefrom to the brickwork sides of the producer at a suitable height above the solid portion of the hearth.

In the accompanying drawings, which illustrate the invention, Figure 1 is a transverse vertical section of the improved gas-producer. Fig. 2 is a longitudinal vertical section. Fig. 3 is a front sectional elevation, and Fig. 4 is a sectional plan of the same. Fig. 5 is a view, to a larger scale, of part of Fig. 1. Fig. 6 is a side view of the meeting ends of two grate-bar sections and a section of the supporting-bracket on line 6 6 of Fig. 4, and Fig. 7 is a part plan of the same and showing two adjacent grate-bars.

As shown by the drawings, the gas-producer A is formed with a central solid hearth B of reduced width, preferably of iron, and the remainder of the bottom is formed by combining with this reduced hearth a series of bars or plates C, resting on bearing-brackets D, rising at an angle, so as to form inclined gratings on either side of the solid hearth B, extending upward to join the brickwork sides A' of the producer. The solid hearth B is preferably supported by the central longitudinal wall B'. Bars C are held apart by projections $c''$ at the ends of the bars. The upper bars (marked C') are close together. The bars are held in position by bolts or similar devices between them.

The inclined or curved sides of the bottom of the producer, in which brick lining is dispensed with, are formed of bars, preferably (but not necessarily) laid horizontally, and provided with slots or openings $c$ in the lower half above the solid central hearth, while the upper portions are formed of half-checked bars C', fitted air-tight. The object of providing the openings toward the bottom only is to secure the injection of air into the center of the fuel in the producer and prevent its taking an upward direction along the vertical sides of the latter, as it is known to do in ordinary producers and furnaces. An arch of clinker, due to the curved or inclined airtight portions of the producer-base, is induced to form between the two sides, so that when the producer is cleared of ash the said arch is maintained and sustains the whole of the incandescent fuel above, while the whole of the ashes beneath the arch are withdrawn through the door in front provided for the purpose. The twofold object is thus attained of clearing the producer without loss of fuel among the ashes or loss of heat and of trapping by means of the arch of clinker above, the whole of the dust arising during the operation of cleaning and preventing it from rising and passing into the settings above. The said arch and fuel are dropped to the bottom of the producer before the latter is filled with fresh fuel and so remain till the second cleaning. The said rising sides may be straight or more or less curved inward to give rigidity to the bearing-brackets D and provide a larger area beneath for ash and water pan chambers E, which I construct under the angled base of the producer and into and through which air and steam are supplied to the producer, being either induced by the draft of the chimney or forced by a jet of steam or by an airblower. The steam-pipe enters the water-pan chamber E near to the adjustable grating H, in the door F. By adjusting the grids or gratings H to vary the size of openings the amount of air drawn in by the steam, as well as by the draft, may be varied.

The bars forming the inclined gratings on each side of the hearth may be formed in single lengths, but are preferably divided, as shown, into two (or more) lengths and are secured at their ends in recessed or pocket brackets built into the brickwork and intermediately or at their mid-points by removable staples or catches I, as shown at Figs. 6 and 7, engaging the bearing-brackets D and projections c', formed on the under sides of the bars C by longitudinal slots 3 in the enlarged ends of the bars.

D', Fig. 5, are narrow curved bars at the ends of the grate-bars parallel with the brackets D, the ends of the grate-bars entering between said parts D and D'. These upper bars are not always essential and are not shown in Figs. 2 and 4. The check-bars may be held in place merely by having their ends inserted between parts D and D'.

The inclined gratings C and openings c extend from the hearth B toward but not to the vertical planes of the walls A' of the producer, so as to introduce air and steam into the central part of the body of fuel in the producer A, so as to admit air and steam into the body of the fuel within the producer; but in proximity to the brick walls they are replaced by solid plates or checked bars C', which prevent the flow of air up the sides of the brickwork and outside the body of fuel. A water-pipe J extends along the under side of each of the inclined gratings, from which water drips into the ash-chambers E, which latter are closed in front by doors K, through which steam or air may be directed from the pipes G.

By the arrangement described the production of clinker is obviated and the trouble hitherto experienced in its removal avoided.

Having now described the invention, what I claim, and desire to secure by Letters Patent, is—

1. A gas-producer composed of a brickwork chamber having a narrow central solid hearth combined with inclined gratings extending from said solid hearth on either side to the brickwork sides of the chamber and having ash and water pan chambers formed under the gratings there being openings c at the lower part of the inclined gratings only, and means for introducing air and steam to said chambers whereby said air and steam are introduced toward the center of body of fuel in the producer, substantially as described.

2. In a gas-producer the combination of a central solid hearth inclined gratings on either side thereof closed ash and water pan chambers under said gratings adjustable grids fitted on the doors of each of said chambers and piping connecting said grids to a blower for forcing air or steam into said chamber the inclined gratings having openings at their lower parts only, whereby air or steam will be directed toward the center of the fuel in the producer substantially as described.

In witness whereof I have hereunto set my hand in presence of two witnesses.

GEORGE ROBERTSON HISLOP.

Witnesses:
WALLACE FAIRWEATHER,
JNO. ARMSTRONG, Junr.